No. 838,728. PATENTED DEC. 18, 1906.
C. J. LOCKWOOD.
OIL FEEDING APPARATUS.
APPLICATION FILED JUNE 27, 1906.
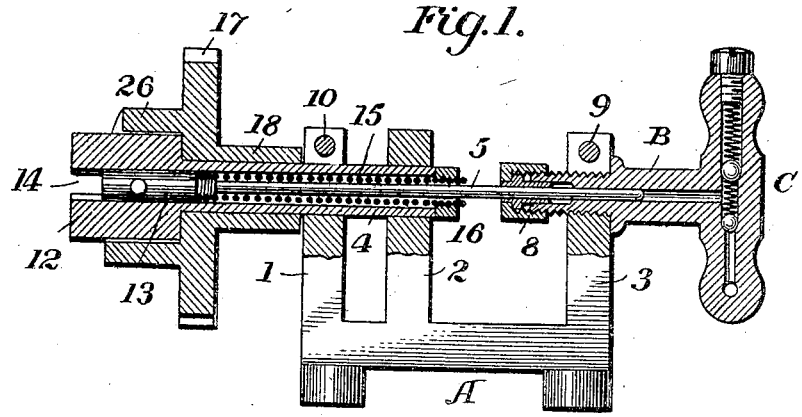
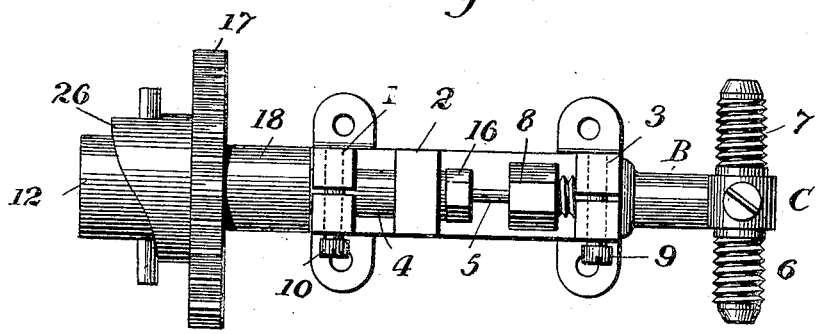
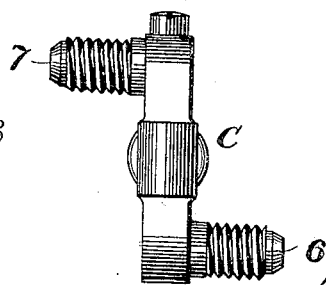
Witnesses
Inventor
Carl J. Lockwood
by
Attorneys

UNITED STATES PATENT OFFICE.

CARL J. LOCKWOOD, OF WASHINGTON, DISTRICT OF COLUMBIA.

OIL-FEEDING APPARATUS.

No. 838,728.     Specification of Letters Patent.     Patented Dec. 18, 1906.

Application filed June 27, 1906. Serial No. 323,617.

*To all whom it may concern:*

Be it known that I, CARL J. LOCKWOOD, a citizen of the United States, residing in the city of Washington, in the District of Columbia, have invented certain new and useful Improvements in Oil-Feed Apparatus, of which the following is a specification.

In the class of apparatus to which this invention relates there is a plunger and a cylinder to which the plunger is adapted provided with inlet and outlet valves and passages, means for retracting the plunger and releasing it at intervals, and a spring which forces the plunger quickly inward when released, so as to eject a small amount of oil from the cylinder toward the part to be supplied with lubricant.

Heretofore apparatus of this class, while operating effectively, have been so constructed that the apparatus is somewhat expensive to make and difficult to assemble and to disassemble in order to get access to the parts; and my invention has for its object to facilitate the construction of the apparatus and the assembling and removal of the parts, to which end I construct the same as fully set forth hereinafter and as illustrated in the accompanying drawings, in which—

Figure 1 is a longitudinal section of an apparatus embodying my improvement; Fig. 2 a plan and Fig. 3 a side view of the valve-casing connected with the cylinder.

The parts of the apparatus are all supported by bracket A, having three arms 1 2 3 with sockets in line with each other and the sockets 1 and 2 adapted to receive a sleeve 4, supporting the parts for operating the plunger 5, and the socket of the arm 3 is adapted to receive the cylinder B, which is connected to or forms part of the valve-casing C, having an inlet branch 6, an outlet branch 7, and channels provided with suitable check-valves and communicating with the bore of the cylinder B. As shown, the cylinder is threaded externally, and the socket in the arm 3 is correspondingly threaded, so that the cylinder may screw into said socket, the threads of the cylinder also receiving the usual screw-cap 8 for carrying in the gland of the packing-box, and the end of the arm 3 is split, so that after the cylinder is screwed into place the parts of the arm may be brought firmly together by a screw 9 to clasp and hold the cylinder from turning. One of the arms 1 2 is also split and provided with a clamp-screw 10, so that after the sleeve 4 is set in place it may be clamped and secured.

The sleeve 4 is provided with an enlargement or head 12, adapted to receive a cross-head 13 at the end of the plunger 5, the arms of said cross-head extending through slots 14 in the head 12, and a spring 15 is screwed onto a threaded inner end of the plunger or head 13 and projects beyond the end of the sleeve, and a nut 16 screws onto the projecting end of the spring and bears against the end of the sleeve, so that by turning the nut the spring can be extended or put under such tension as to tend to carry the plunger forward into the cylinder B.

Upon the sleeve 4 is mounted a cam for acting on the cross-head 13 to carry out the plunger against the tension of the spring and suddenly release the same at intervals. As shown, the cam is formed by the spiral edges of a hollow cylinder 26 projecting from a disk 17, having a hub 18, which turns upon the sleeve, the said cam edges bearing upon the arms of the cross-head 13 and then passing from the same to permit the spring to force the plunger into the cylinder.

It will be seen that by turning the nut 16 any desired tension may be applied to the spring and that by turning the cam at greater or less speed the number of movements of the plunger per minute may be varied.

Any suitable means may be employed for turning the cam; but, as shown, the disk is provided with peripheral teeth adapted to engage a suitable pawl, (not shown,) but which may be operated as in the apparatus patented to P. J. Lockwood, No. 781,891, February 7, 1905.

It will be seen that all the operating parts are adapted to be supported in the sockets of the arms of the bracket in line with each other, so that the bracket may be readily machined to adapt it to receive the said parts, and the latter can be readily introduced and withdrawn and firmly secured by simply tightening the screws 9 10, that all of the parts connected with the plunger are concentric with each other and can be machined in constructing the parts from the same center and can therefore be readily assembled, and further, that the sleeve 4 supports and guides all of the operating parts connected with the plunger, so that they may be placed in position and removed by simply introducing the sleeve into its socket and withdrawing it therefrom.

I claim as my invention—

1. The combination in an oil-feed apparatus, of a plunger, a surrounding spring for propelling the same in one direction, an inclosing sleeve and concentric cam for moving the plunger against the tension of the spring, a valve-casing having a cylinder for the plunger, and a bracket with arms having openings in line with each other for receiving the cylinder and sleeve.

2. The combination in an oil-feed apparatus, of a plunger, a surrounding spring for propelling the same in one direction, an inclosing sleeve and concentric cam for moving the plunger against the tension of the spring, a valve-casing having a cylinder for the plunger, and a bracket with arms having openings in line with each other for receiving the cylinder and sleeve, said arms split and provided with clamping-screws.

3. The combination with a bracket having vertical standards, of a pump-cylinder secured detachably in one of the standards, and a tube or sleeve secured axially in line with the pump-cylinder, detachably in the other standard and slotted at the outer end, a plunger fitted to the pump-cylinder and provided with a cross-bar passing through the said slot, a spring for carrying the plunger in one direction, and a disk turning upon the sleeve outside the supporting-standard and provided with a cam engaging the cross-bar, substantially as set forth.

4. The combination with the sleeve and plunger and its cross-head, of a surrounding coiled spring connected to the plunger at its inner end and projecting beyond the sleeve, and a nut bearing on the end of the sleeve, the threads of said nut engaging the spring.

CARL J. LOCKWOOD.

Witnesses:
CHARLES E. FOSTER,
JOHN J. MCCARTHY.